(12) United States Patent
Tsukamoto et al.

(10) Patent No.: US 6,516,170 B2
(45) Date of Patent: Feb. 4, 2003

(54) IMAGE FORMING APPARATUS WHICH ENABLES EASY TO OBSERVE PRINTING IN A MANNER ADAPTABLE TO A USER'S REQUEST

(75) Inventors: Yasumasa Tsukamoto, Tokyo (JP); Akio Ueda, Tokyo (JP); Yoshinao Kitahara, Tokyo (JP); Takaaki Sakai, Tokyo (JP); Masaru Ushio, Tokyo (JP); Hiroki Ueda, Tokyo (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/809,484

(22) Filed: Mar. 15, 2001

(65) Prior Publication Data
US 2001/0026710 A1 Oct. 4, 2001

(30) Foreign Application Priority Data
Mar. 24, 2000 (JP) .......................... 2000-085419

(51) Int. Cl.$^7$ ............................. G03G 15/36
(52) U.S. Cl. .................... 399/182; 399/183; 358/452; 358/453
(58) Field of Search ................ 399/81, 172, 182, 399/183, 184, 185, 187, 190; 358/448, 450, 452, 453

(56) References Cited

U.S. PATENT DOCUMENTS

| | | | | |
|---|---|---|---|---|
| 5,497,217 A | * | 3/1996 | Yoshida | 399/182 X |
| 5,515,144 A | * | 5/1996 | Miyasaka et al. | 399/182 X |
| 5,671,429 A | * | 9/1997 | Tanaka | 399/184 X |
| 5,841,547 A | * | 11/1998 | Takemoto et al. | 399/81 X |

* cited by examiner

*Primary Examiner*—Hoan Tran
(74) *Attorney, Agent, or Firm*—Frishauf, Holtz, Goodman & Chick, P.C.

(57) ABSTRACT

An image forming apparatus includes: an image reading device for reading images on a document; an image recording device for recording images read by the image reading device on a recording material; an inputting device that makes it possible for an operator to select either area from plural imaginary areas established in advance and to adjust a position in the selected area, for setting, on a given position on the recording material, a recording position for additional information to be recorded on the recording material by the image recording device in addition to the images stated above; and a controller that controls the image recording device for recording the additional information on the recording position that is set by the inputting device.

22 Claims, 13 Drawing Sheets

FIG. 6

| FIXED FORM EXPRESSION PRINTING MODE | | | | JOB 10 APPLIED FUNCTION "STAMP/OVERLAY" | | |
|---|---|---|---|---|---|---|
| SIZE OF LETTER | FIXED FORM EXPRESSION | | | SELECTION OF PRINTING POSITION | | |
| LARGER | URGENT | SECRET | TEMPORARY | UPPER LEFT | UPPER CENTER | UPPER RIGHT |
| PRINTING PAGE COVER SHEET ONLY | CIRCULATION | TOP SECRET | CONFIDENTIAL | LEFT CENTER | CENTER | RIGHT CENTER |
| | COLLECTION | SECRET OUTSIDE COMPANY | DRAFT | | | |
| | COPY PROHIBITED | IMPORTANT | COPY | LOWER LEFT | LOWER CENTER | LOWER RIGHT |
| FINE ADJUSTMENT OF POSITION | CHANGE OF LETTER SIZE | PRINTING PAGE | | CANCEL | OK | |

91 (selection of printing position area)
96 (fine adjustment of position)

FIG. 7

| FINE ADJUSTMENT OF POSITION | | JOB 10 APPLIED FUNCTION "STAMP/OVERLAY" | | |
|---|---|---|---|---|
| MOVED FROM REFERENCE POSITION  UPWARD 15.0 mm  LEFTWARD 10.0 mm | UPWARD | 1 | 2 | 3 |
| | DOWNWARD | 4 | 5 | 6 |
| | RIGHTWARD | 7 | 8 | 9 |
| | LEFTWARD | 0 | ▲ | ▼ |
| | | | CANCEL | OK |

93
94

1ST SHEET

FRONT SIDE | 12TH PAGE | 1ST PAGE

2ND SHEET

10TH PAGE | 3RD PAGE

3RD SHEET

8TH PAGE | 5TH PAGE

1ST SHEET

BACK SIDE | 2ND PAGE | 11TH PAGE

2ND SHEET

4TH PAGE | 9TH PAGE

3RD SHEET

6TH PAGE | 7TH PAGE

1ST SHEET

FRONT SIDE | 1ST PAGE | 12TH PAGE

2ND SHEET

3RD PAGE | 10TH PAGE

3RD SHEET

5TH PAGE | 8TH PAGE

1ST SHEET

BACK SIDE | 11TH PAGE | 2ND PAGE

2ND SHEET

9TH PAGE | 4TH PAGE

3RD SHEET

7TH PAGE | 6TH PAGE

FIG. 11(a) FIG. 11(c) FIG. 11(e)
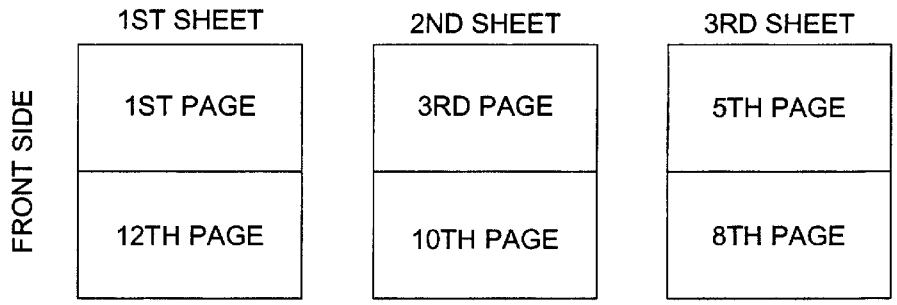
FIG. 11(b) FIG. 11(d) FIG. 11(f)
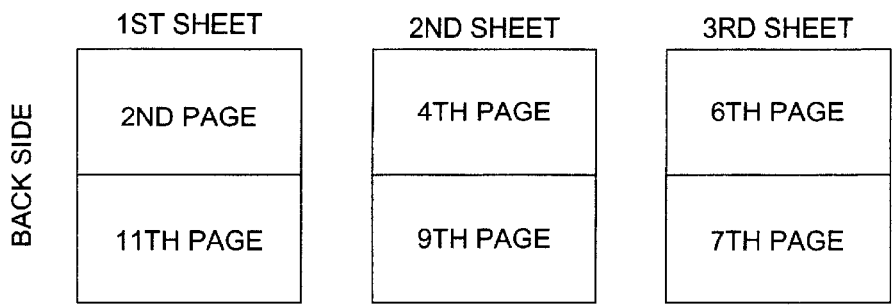
FIG. 12

1ST SHEET

1ST PAGE

12TH PAGE

2ND SHEET

3RD PAGE

10TH PAGE

3RD SHEET

5TH PAGE

8TH PAGE

1ST SHEET

2ND PAGE

11TH PAGE

2ND SHEET

4TH PAGE

9TH PAGE

3RD SHEET

6TH PAGE

7TH PAGE

IMAGE FORMING APPARATUS WHICH ENABLES EASY TO OBSERVE PRINTING IN A MANNER ADAPTABLE TO A USER'S REQUEST

BACKGROUND OF THE INVENTION

The present invention relates to an image forming apparatus.

As an image forming apparatus, there have been provided a copying machine wherein a document is placed or supplied on a platen glass (document glass), and images representing character strings or patterns written on the document, or the combination of the character strings and the patterns are copied on a transfer sheet, a printer wherein images which are made on a word processor of a personal computer, for example, and are the same as aforesaid images are printed on a transfer sheet, and a facsimile machine wherein images which are transmitted through communication lines and are the same as the foregoing are printed. There is further known the so-called "compound machine" wherein all functions owned by the aforesaid copying machine, the printer and the facsimile machine are provided in one apparatus.

In conventional image forming apparatuses, there is known one that is provided with a function to print additional information related to the date and hour, a stamp or a page, in addition to forming of images. With regard to conventional printing functions, however, extremely simple functions only are provided, exemplifying that a printing position is fixed in advance and it cannot be changed for stamp printing, for example, and pages are printed in the simple order of documents read, which has been a problem on the point of conducting printing that is easy to observe and satisfies user's requests.

For example, as the problem stated above, there will be explained, in particular, a problem in conducting a printing function concerning pages together in the course of image forming on transfer sheets for chaptered document groups. The chaptered document groups in this case are those into some chapters wherein the first chapter is composed, for example, of 6 document pages and the second chapter is composed of 8 document pages, and in this case, the total number of document sheets are 14 pages. When these pages are subjected to image formation on transfer sheets and pages are printed simultaneously, in the way of printing "p1, p2, . . . p14", relationship between "chapter" and "page" is lost, resulting in page printing which is awkward.

SUMMARY OF THE INVENTION

The invention has been achieved in view of the circumstances stated above, and its object is to provide an image forming apparatus having a function to conduct printing that is easy to observe and satisfies user's requests.

The object of the invention is achieved by either one of the following structures.

Structure (1)

An image forming apparatus comprising: an image reading means for reading images on a document; an image recording means for recording images read by the image reading means on a recording material; an inputting means that makes it possible for an operator to select either area from plural imaginary areas established in advance and to adjust a position in the selected area, for setting, on a given position on the recording material, a recording position for additional information to be recorded on the recording material by the image recording means in addition to the images stated above; and a control means that controls the image recording means for recording the additional information on the recording position that is set by the inputting means.

Structure (2)

An image forming apparatus comprising: an image reading means for reading images on a document; an image recording means for recording images read by the image reading means on a recording material; an inputting means that makes it possible for an operator to set, on a given position on the recording material, a recording position for additional information to be recorded on the recording material by the image recording means in addition to the images stated above; and a control means that records the additional information at the recording position established by the inputting means, and controls the image recording means so that there may be carried out image recording that is suitable for folding and superposing plural recording materials on which images have been recorded and for making them to be of a booklet type.

Structure (3)

An image forming apparatus comprising: an image reading means for reading images on a document; an image recording means for recording images read by the image reading means and page information on a recording material; a dividing and setting means for giving dividing symbols which make it possible to divide each of plural document bundles in a small set constituting document groups; and a control means that controls the image recording means so that the images, the page information and the dividing symbols may be recorded on the recording material.

Further, preferable structures are as follows.

Structure 1

An image forming apparatus which can print additional information on a recording material in addition to an image when reading the image described on a document and forming the image on the recording material, wherein there are provided an input means capable of setting the printing position for the additional information at any position on the recording material, and a control means that conducts printing of the additional information based on the aforesaid setting on the recording material together with forming of the image on the recording material.

Structure 2

The image forming apparatus according to Structure 1, wherein the additional information is composed of a fixed form expression, page information, or information of the date and hour.

Structure 3

The image forming apparatus according to Structure 1, wherein the recording material is divided into imaginary areas in prescribed quantity, and the setting stated above is conducted by selecting one area from the imaginary areas in prescribed quantity.

Structure 4

The image forming apparatus according to Structure 3, wherein the imaginary areas in prescribed quantity are represented by 9 areas positioned respectively at upper left, upper center, upper right, center left, center, center right, lower left, lower center and lower right areas on the recording material.

Structure 5

The image forming apparatus according to Structure 3 or Structure 4, wherein it is possible, in the case of the aforesaid setting, to conduct adjustment from a standard point determined in advance in the imaginary areas.

Structure 6

The image forming apparatus according to Structure 5, wherein the adjustment is conducted by inputting of numerical values relating to each of upward, downward, leftward and rightward directions.

Structure 7

The image forming apparatus according to Structure 6, wherein the inputting of numerical values is conducted within a range from −50 mm to +50 mm.

Structure 8

An image forming apparatus which can print additional information on a recording material in addition to an image when reading the image described on a document and forming the image on the recording material, wherein there are provided an input means capable of setting the printing position for the additional information at any position on the recording material, and a control means that conducts printing of the additional information based on the aforesaid setting on the recording material together with image formation for binding a plurality of recording materials in a booklet type.

Structure 9

The image forming apparatus according to Structure 8, wherein the recording material is divided into 9 areas positioned respectively at upper left, upper center, upper right, center left, center, center right, lower left, lower center and lower right areas on the recording material, and the setting stated above is conducted by selecting one area from the 9 imaginary areas.

Structure 10

The image forming apparatus according to Structure 9, wherein, when the area selected is an area adjacent to the page that adjoins to the booklet, the control means stated above controls so that the printing position on the recording material for the additional information may be in the vicinity of the edge of the recording material that is away from the center portion of the recording material which will result in a folded portion of the booklet.

Structure 11

The image forming apparatus according to Structure 9, wherein, when the booklet is bound on a portrait basis and the 9 imaginary areas excluding upper center, center and lower center areas are selected,. the control means stated above controls so that the printing position on the recording material for the additional information may be in the vicinity of the edge of the recording material that is away from the center portion of the recording material which will result in a folded portion of the booklet.

Structure 12

The image forming apparatus according to Structure 9, wherein, when the booklet is bound on a landscape basis and the 9 imaginary areas excluding center left, center and center right areas are selected, the control means stated above controls so that the printing position on the recording material for the additional information may be in the vicinity of the edge of the recording material that is away from the center portion of the recording material which will result in a folded portion of the booklet. recording material.

Structure 13

The image forming apparatus according to Structure 9, wherein the 9 imaginary areas excluding the center portion are selected, the control means stated above controls so that the printing position on the recording material for the additional information may be in the vicinity of the edge of the recording material that is away from the center portion of the recording material which will result in a folded portion of the booklet.

Structure 14

The image forming apparatus according to Structure 13, wherein, when the booklet is bound on a portrait basis, and when the upper center area is selected, the control means changes setting of the printing position automatically to the upper left or upper right, and when the booklet is bound on a portrait basis, and when the lower center area is selected, the control means changes setting of the printing position automatically to the lower left or lower right.

Structure 15

The image forming apparatus according to Structure 13, wherein, when the booklet is bound on a landscape basis, and when the center left area is selected, the control means changes setting of the printing position automatically to the upper left or lower left, and when the booklet is bound on a landscape basis, and when the center right area is selected, the control means changes setting of the printing position automatically to the upper right or lower right.

Structure 16

The image forming apparatus according to either one of Structures 8–15, wherein the additional information is page information relating to the plural recording sheets.

Structure 17

An image forming apparatus which can print page information on a recording material in addition to an image when reading the image described on each document constituting document groups and forming the images on the plural recording materials, wherein there are provided an input means which can conduct grouping and setting for two or more of small bundles of documents while giving each number and can constitute the document groups with two or more of small bundles of documents mentioned above, and a control means which conducts printing of the page information on the recording material in a format corresponding to the aforesaid number, together with formation of the image on the recording material.

Structure 18

The image forming apparatus according to Structure 17, wherein the aforesaid number is a chapter number which is given to one unit that represents the document bundle.

Structure 19

The image forming apparatus according to Structure 18, wherein the grouping and the setting are conducted by specifying where the document whose chapter number is to be changed is positioned in the document groups.

Structure 20

The image forming apparatus according to Structure 17, wherein the aforesaid number is a JOB number which is given to one unit for image forming that represents the document bundle.

Structure 21

An image forming apparatus which can print page information on a recording material in addition to an image when reading the image described on each document constituting document groups and forming the images on the plural recording materials, wherein there is provided a control means which conducts, simultaneously with formation of the aforesaid image on the recording material, the printing of the above-mentioned page information on the recording material together with printing for the aforesaid number of all documents, after all documents constituting the document groups are read collectively.

BRIEF DESCRIPTION OF THE DRAWINGS

FIG. 6 is an illustration showing a concrete example of a screen which appears when "fixed form expression" is selected in FIG. 5.

FIG. 7 is an illustration showing a concrete example of a screen which appears when "adjustment button" is selected in FIG. 5.

Figure 8:
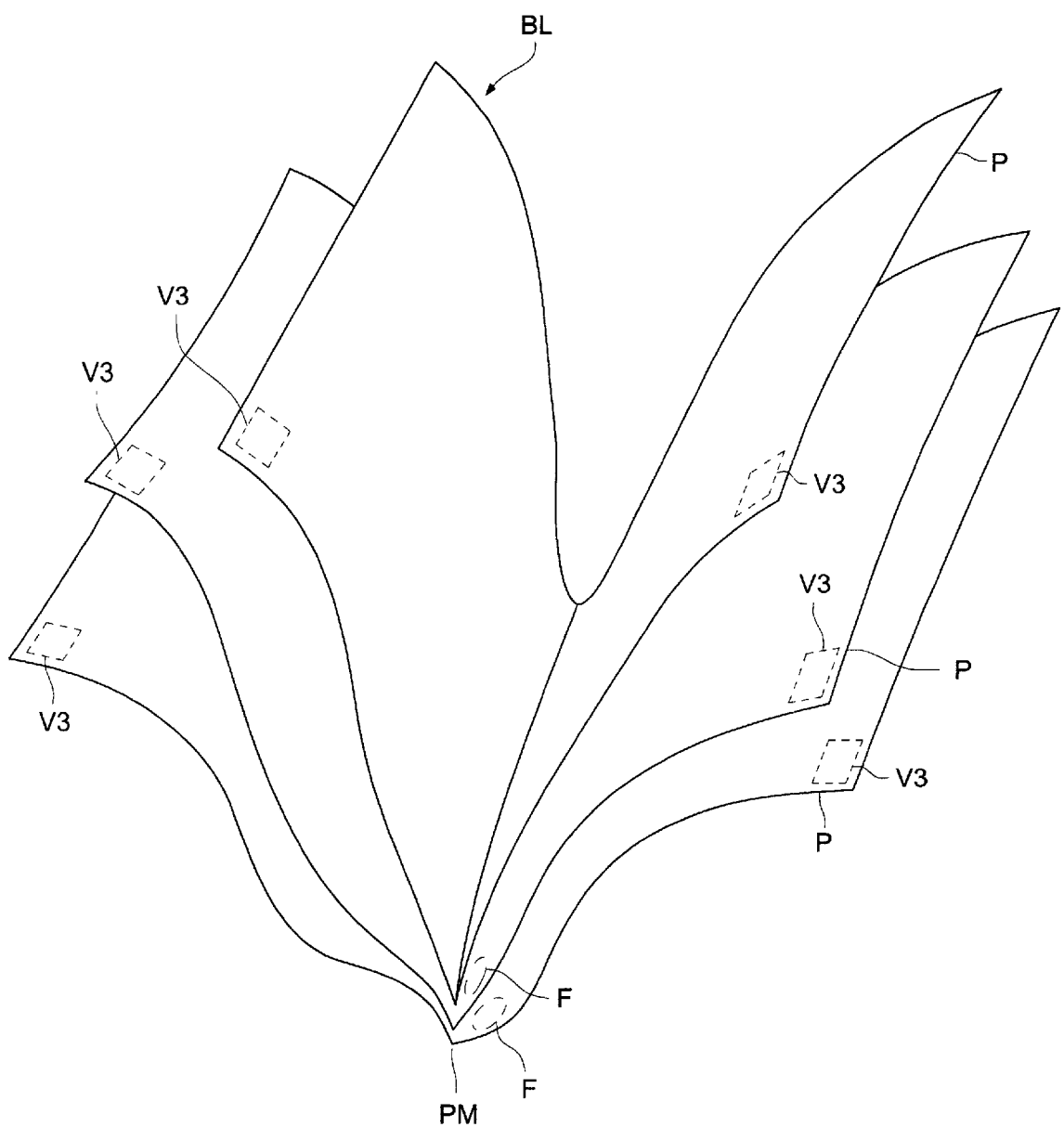
FIG. 8 is a schematic diagram illustrating a form of a booklet.
Figure 9A:
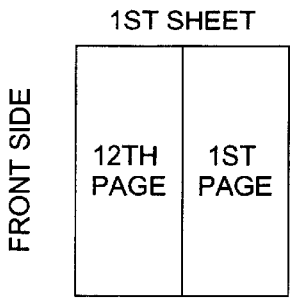
Figure 9C:
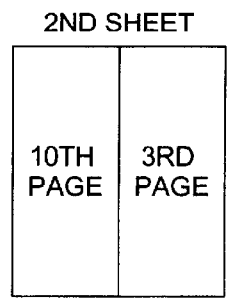
Figure 9E:
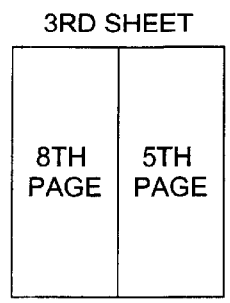
Figure 9B:
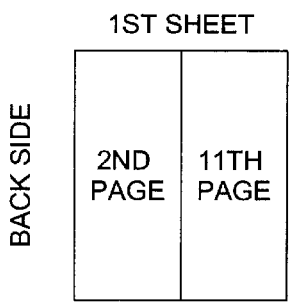
Figure 9D:
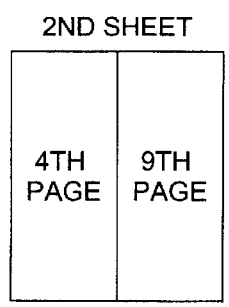
Figure 9F:
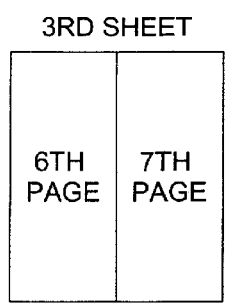
Figure 10A:
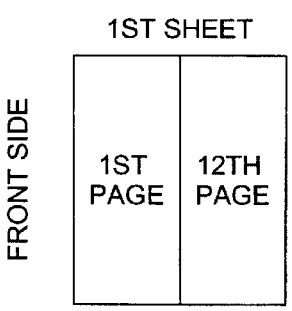
Figure 10C:
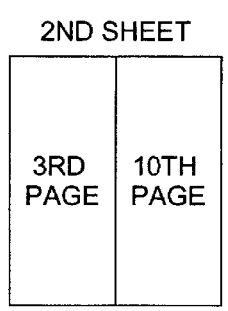
Figure 10E:
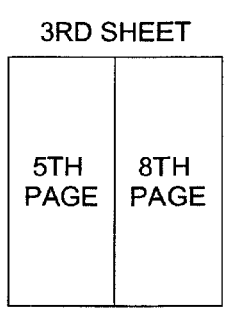
Figure 10B:
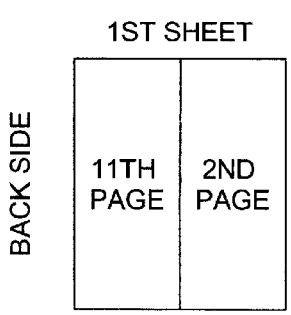
Figure 10D:
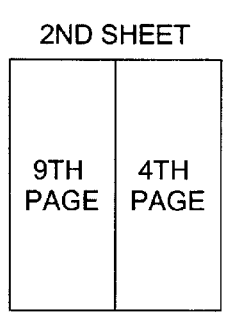
Figure 10F:
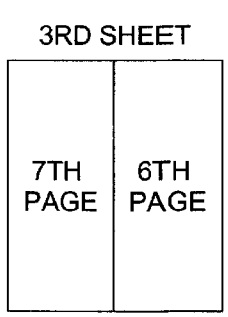

Each of FIGS. 9(a)–9(f) is an illustration showing how images are formed and how pages are printed for the booklet shown in FIG. 8, and it relates to the occasion wherein the booklet is composed of 12 pages which are bound on the left side.

Each of FIGS. 10(a)–10(f) is an illustration which is the same as that in FIGS. 9(a)–9(f), and it relates to the occasion wherein the booklet is composed of 12 pages which are bound on the right side.

Each of FIGS. 11(a)–11(f) is an illustration showing how images are formed and how pages are printed for the booklet bound on a landscape basis, which is different from each of FIGS. 9(a)–9(f) or of FIGS. 10(a)–10(f), and it relates to the occasion wherein the booklet is composed of 12 pages.

Figure 5:
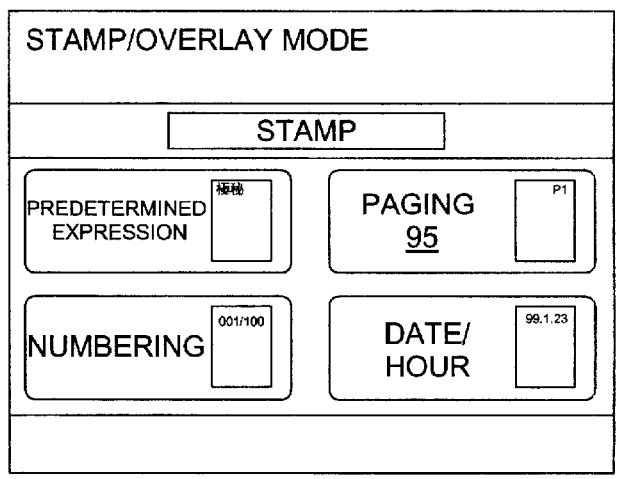
FIG. 5 is an illustration showing a concrete example of a selection screen for additional information.

FIG. 12 is an illustration showing a concrete example of a screen which appears when "page button" is selected in FIG. 5.

Figure 13:
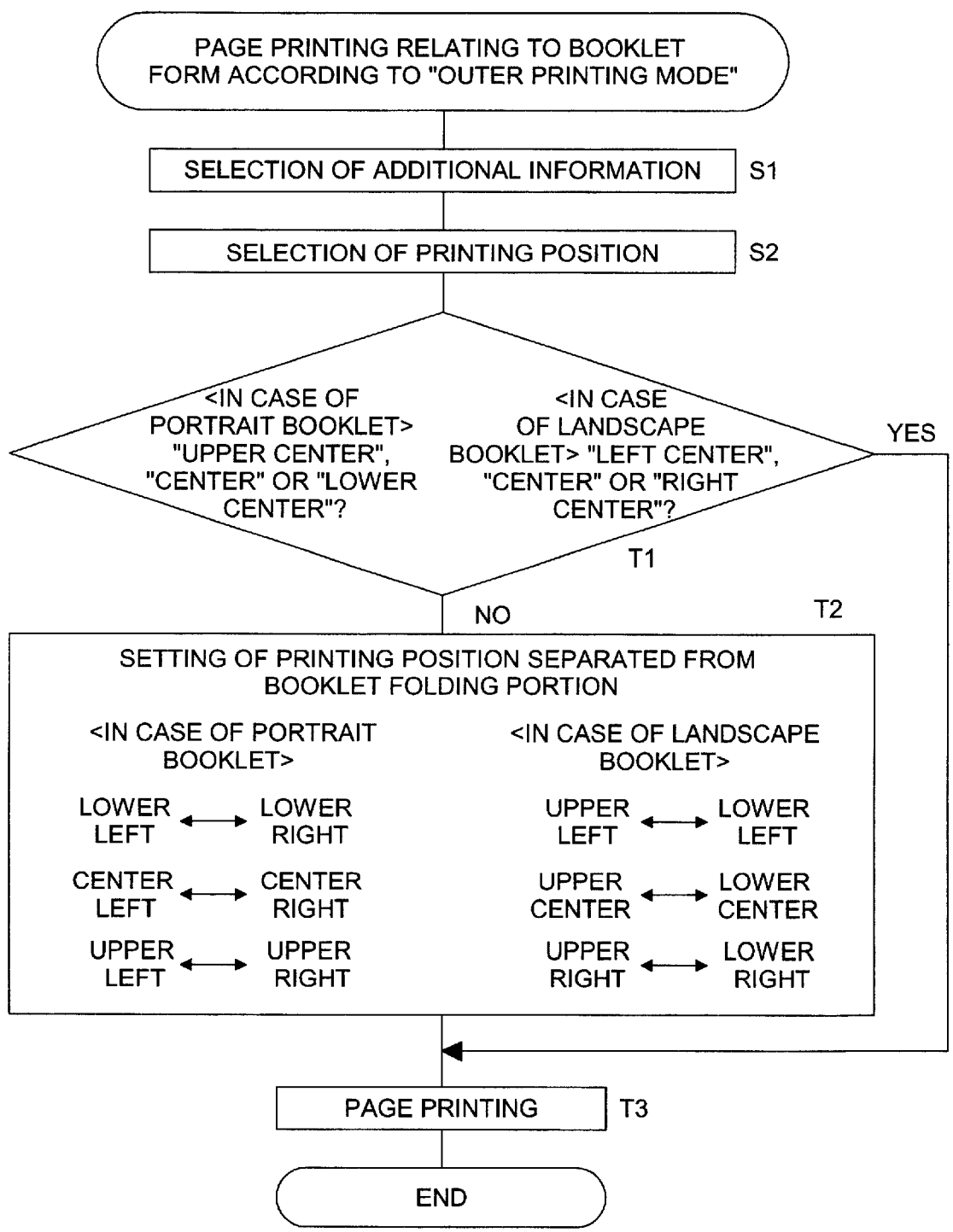

FIG. 13 is a flow chart showing an example of work procedures for conducting page printing relating to a booklet type in "outer printing mode".

Each of FIGS. 14(a)–14(f) is an illustration showing how page printing for a booklet of a portrait type is controlled in the occasion shown in FIG. 13.

Each of FIGS. 15(a)–15(f) is an illustration showing how page printing for a booklet of a landscape type is controlled in the occasion shown in FIG. 13.

Figure 16:
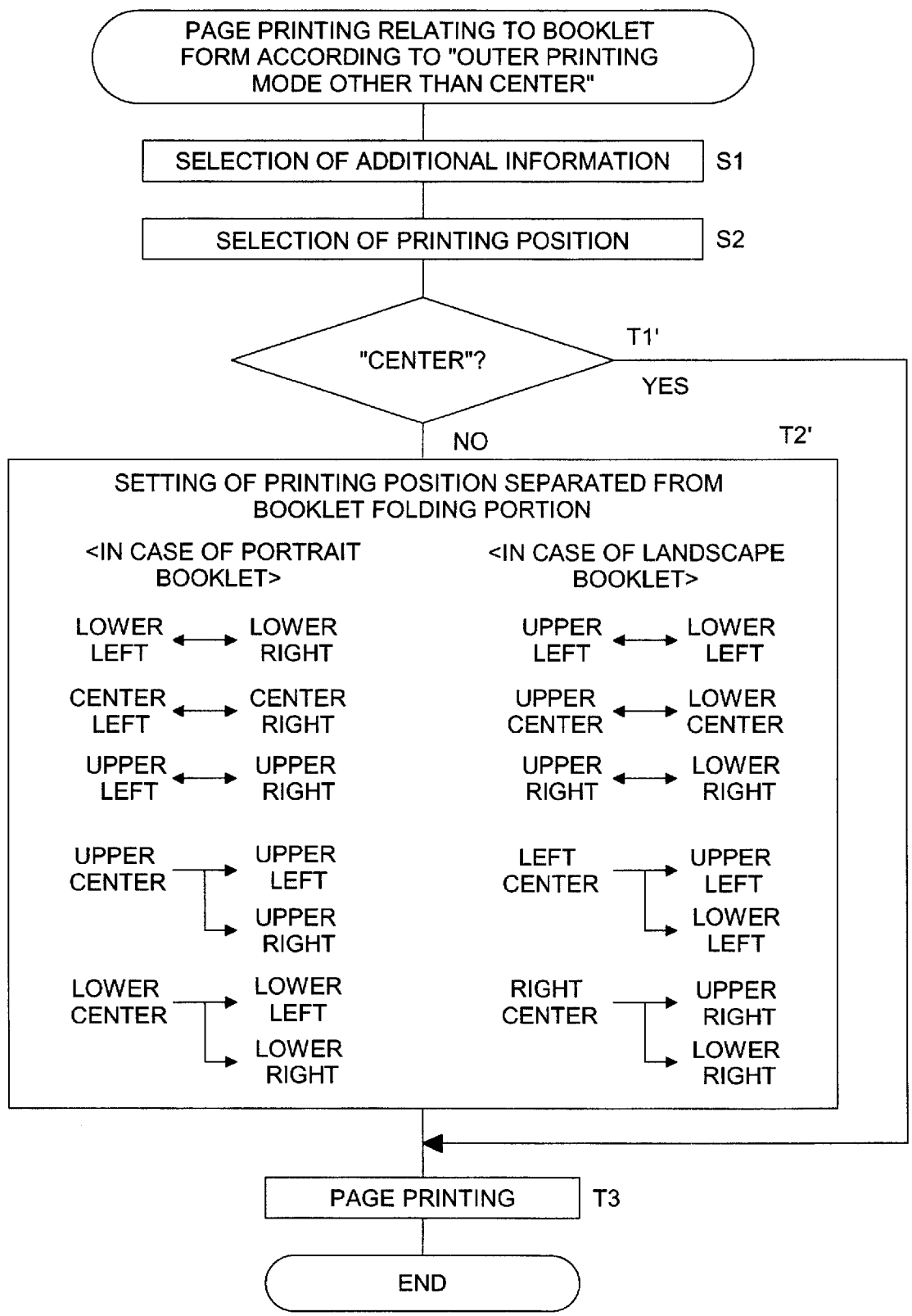

FIG. 16 is a flow chart showing an example of work procedures for conducting page printing relating to a booklet type in "outer printing mode other than center".

Figure 17:
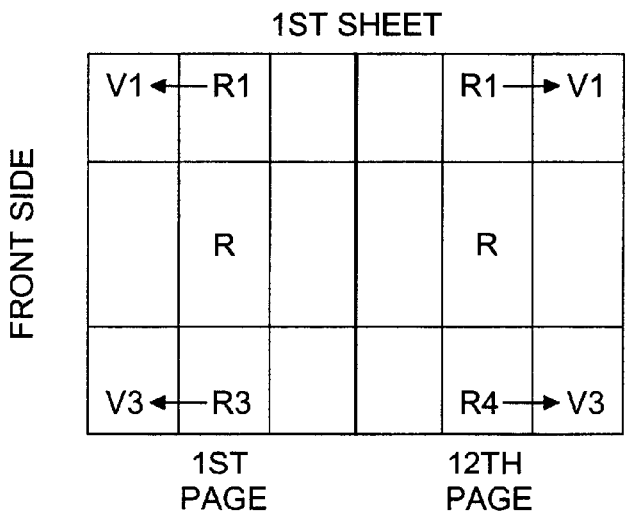

FIG. 17 is an illustration showing how page printing for a booklet of a portrait type is controlled in the occasion shown in FIG. 16.

Figure 18:
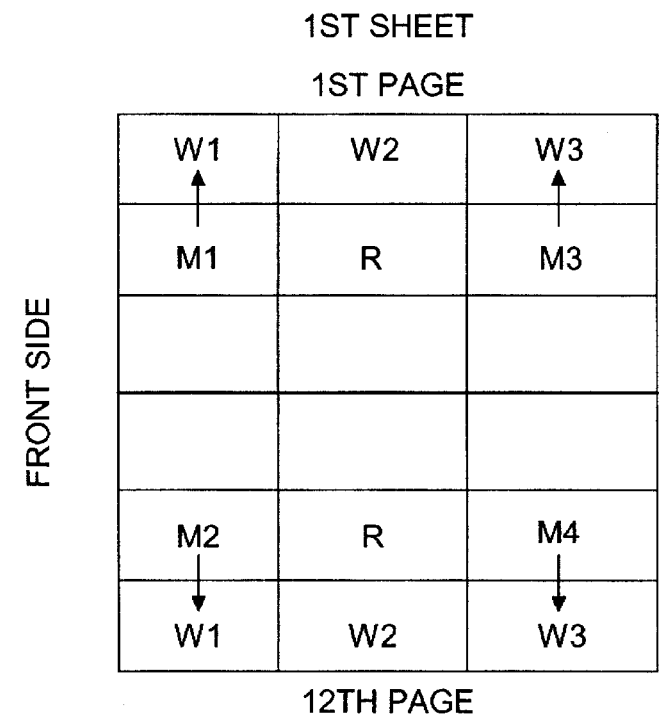

FIG. 18 is an illustration showing how page printing for a booklet of a landscape type is controlled in the occasion shown in FIG. 16.

Figure 19:
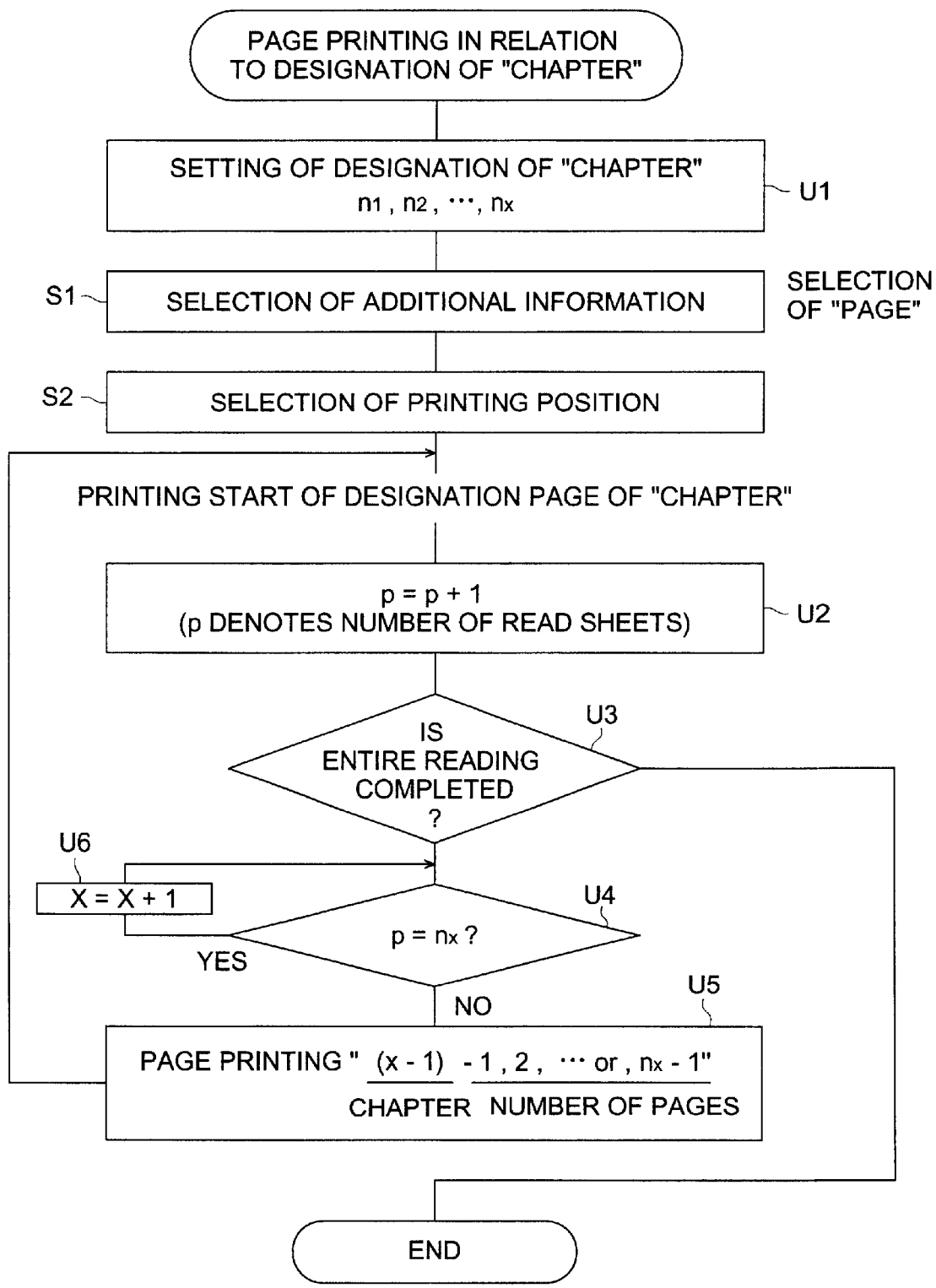

FIG. 19 is a flow chart showing an example of work procedures for conducting page printing relating to chaptering.

DETAILED DESCRIPTION OF PREFERRED EMBODIMENT

Figure 1:
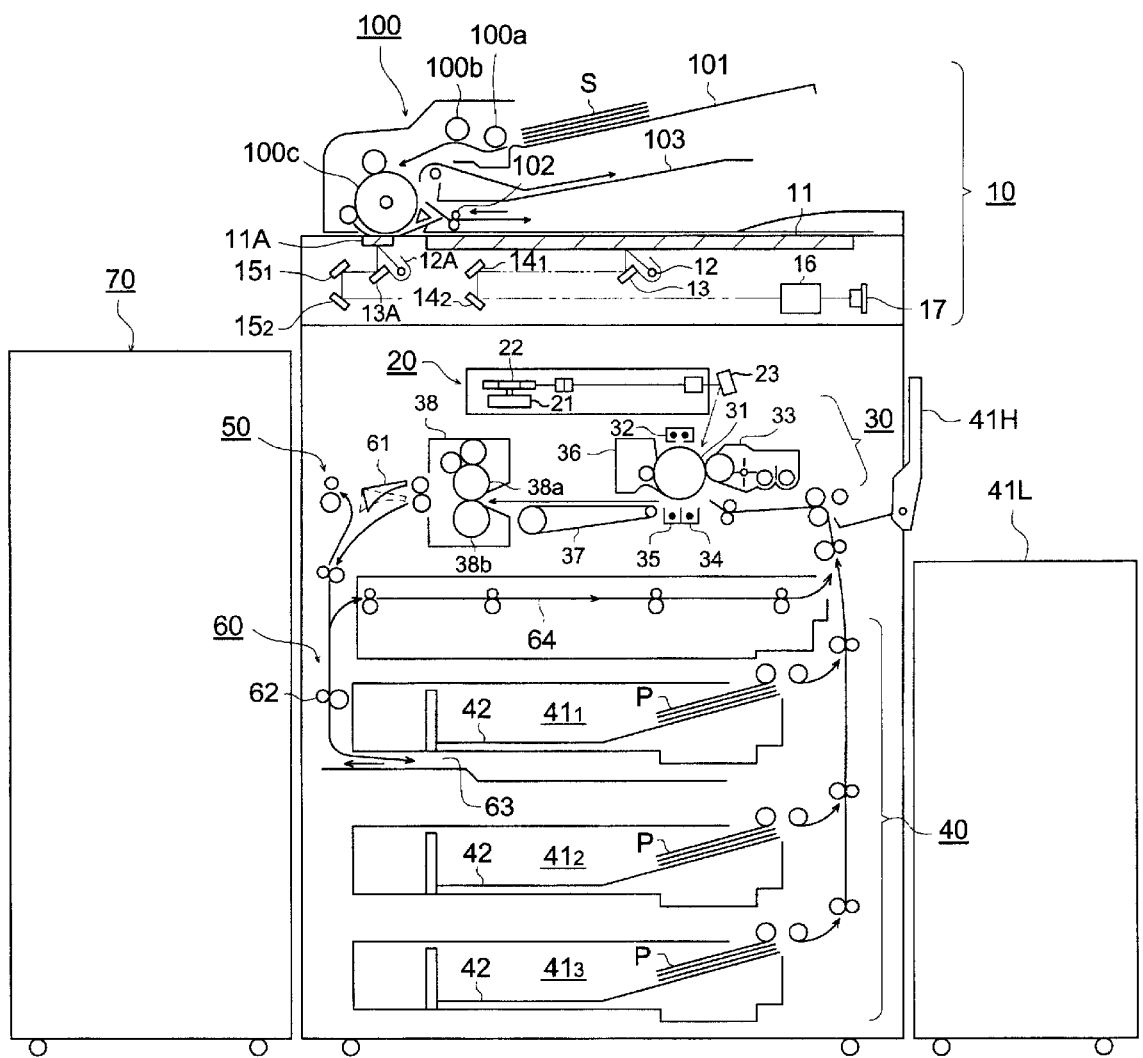
FIG. 1 is a schematic diagram showing an example of structure of a copying apparatus relating to the present embodiment.

An embodiment of the invention will be explained as follows, referring to the drawings. FIG. 1 is a schematic diagram showing an example of the structure of a copying apparatus (i.e., image forming apparatus) according to a first embodiment. In FIG. 1, the copying apparatus comprises image reading section 10, image writing section 20, image forming section 30, transfer sheet conveyance section 40, transfer sheet ejection section 50, and transfer sheet reversing section 60, and there are further provided outer sheet feeding means 41L and finishing section 70 which are mounted on the outer surface of the apparatus. Incidentally, the term "transfer sheet" as used with respect to the first embodiment corresponds to a "recording material".

The image reading section 10 is a station which reads character strings or patterns described on document S as optical information through radiation light of a light source, and converts them into electric information.

The document S is directly placed on platen glass (document glass) 11 in a way that a document surface (surface on which an image is formed) of the document S faces the surface of the platen glass 11. Light source 12 radiates light on the document surface placed. Light arriving at the document surface turns into light (information) including image information and is reflected on the document surface to arrive at mirror 13. Incidentally, the light source 12 and the mirror 13 are arranged to be capable of moving along the surface of platen glass 11 so that the document surface may be scanned entirely.

Further, the copying apparatus in the present embodiment is equipped with automatic two-sided document conveyance section 100 representing an automatic document feeding means. The automatic two-sided document conveyance section 100 is arranged, as shown in FIG. 1, so that one sheet of document S is separated from a bundle of plural documents S stacked on document tray 101 to be fed out by feed rollers 100a and 100b, and is supplied to platen glass 11A through roller 100c. Below the platen glass 11A, there are provided fixed light source 12A and mirror 13A. Due to these arrangements, document surfaces for a bundle of plural documents S can be read continuously in the same way as in the foregoing.

In addition to the foregoing, it is also possible to read both sides of document S in the arrangement of the automatic two-sided document conveyance section 100 and the platen glass 11A shown in FIG. 1. In this case, the surface on one side of document S is read by light source 12A, then, after completion of the reading, the document S is fed out by reversing roller 102 temporarily rightward in the drawing, and after that, the reversing roller 102 is reversed so that the document S is taken up by roller 100c while the document S is conveyed leftward in the drawing, thus the surface on the other side of the document S is made to face the surface of the platen glass 11A. Incidentally, document S supplied from the automatic two-sided document conveyance section 100 and is read by light source 12A is ejected to ejection tray 103 to be stacked thereon successively.

Now, optical information relating to the document surface read by light source 12 or 12A as stated above is reflected on mirrors $14_1$ and $14_2$ or $15_1$ and $15_2$, and arrives at CCD image pick-up device 17 through image forming optical system 16. On the CCD image pick-up device 17, there is provided a photoelectric surface (not shown) on which a plurality of pixels each having a photoelectric conversion function are arranged, and these plural pixels receive optical information including image information on the document surface which are converted into electric information.

The image reading section 20 is a station which radiates (writes), on photoreceptor drum 31 which will be described later, a laser beam controlled based on the electric information obtained in the aforesaid way, and forms an electrostatic latent image on the photoreceptor drum 31.

The electric information mentioned above including image information obtained through conversion of optical information relating to the document surface is used for conducting control relating to a laser beam emitted from an unillustrated semiconductor laser. A laser beam emitted through the controlling based on the electric information stated above is radiated on polygon mirror 22 that is made to be capable of rotating with its central portion connected to drive motor 21, and the laser beam reflected on the polygon mirror is radiated on photoreceptor drum 31 through reflection mirror 23. When the polygon mirror 22 rotates while it is reflecting the laser beam, the laser beam is radiated on the photoreceptor drum 31 while the laser beam is scanning in the axial direction of the photoreceptor drum. Owing to the radiation of the laser beam, an electrostatic latent image based on the electric information is formed on the photoreceptor drum 31.

The image forming section 30 is a station where an image is formed on transfer sheet P based on the electrostatic latent image formed on the photoreceptor drum 31.

As a prior condition for formation of an electrostatic latent image on photoreceptor drum 31 by radiation of a laser beam stated above, the entire surface of the photoreceptor drum 31 is charged uniformly by charging section 32. Developing section 33 visualizes the electrostatic latent image by sticking thereon the charged toner particles. In transfer section 34, the toner particles mentioned above are transferred and stuck on transfer sheet P conveyed to the transfer section separately, thus, a toner image is formed on the transfer sheet P.

For the surface of the photoreceptor drum 31, separation section 35 strips off transfer sheet P attracted to the photoreceptor drum 31, and cleaning section 36 removes toner remaining on the photoreceptor drum 31 after the aforesaid transfer operations to create the cleaned surface, so that an electrostatic latent image may be formed after uniform recharging by charging section 32 and radiation of a laser beam. On the other hand, transfer sheet P is conveyed to fixing section 38 through conveyance mechanism 37. In the fixing section, heat and pressure are given to transfer sheet P by heat rollers 38a and 38b so that the transferred toner image may be fixed and thereby an image may be formed. After this, the transfer sheet P is ejected out of the copying apparatus through several rollers provided on transfer sheet ejection section 50. At this point of time, "copying" of an image relating to the document surface on transfer sheet P is completed.

Incidentally, in the copying apparatus of the present embodiment, it is possible to conduct transfer of a toner image from the photoreceptor drum 31 to transfer sheet P not only for the surface on one side of the transfer sheet P but also for the surface on the other side of the transfer sheet P. In this case, the transfer sheet P finished in terms of copying on one side is conveyed to transfer sheet reversing section 60. Guide section 61 conducts switching of a conveyance path for transfer sheet P relating to the transfer sheet reversing section 60 and the transfer sheet ejection section 50. When the guide section 61 is switched so that transfer sheet P is conveyed downward in the drawing, the transfer sheet P is conveyed out to reversing section 63 through reversing roller 62. Next, under the condition that transfer sheet P has been fed out by a prescribed amount toward the reversing section 63, the reversing roller 62 is reversed and the transfer sheet P is conveyed to reversing conveyance path 64. After that, the transfer sheet P passes through the path 64 and arrives at the upstream side of photoreceptor drum 31 again. At this point of time, the surface of transfer sheet P facing the surface of photoreceptor drum 31 represents a surface which is different from the surface transferred before passing transfer sheet reversing section 60. Incidentally, in general, when forming an image actually on the reversed transfer sheet P, new image information is written on photoreceptor drum 31 by the image writing section 20.

The transfer sheet conveyance section 40 is a station where transfer sheet P is conveyed to the image forming section 30 stated above, especially to its photoreceptor drum 31.

Transfer sheet P is stacked and placed on tray 42 provided on each of plural sheet feed cassettes (sheet feed means) 41 (three sheet feed cassettes $41_1$, $41_2$ and $41_3$ in the drawing) structured stepwise. The sheet feed cassette 41 is constituted so that it may be housed in the apparatus main body when transfer sheet P is fed out to the image forming section 30, namely, when an image is formed, and it may be drawn out of the apparatus main body when transfer sheet P is replenished. With regard to each of sheet feed cassettes $41_1$, $41_2$ and $41_3$, it is possible to load transfer sheet P in different sizes such as "A4" in the first sheet feed cassette $41_1$ and "A3" in the second sheet feed cassette $41_2$, for example, or to load transfer sheet P of different types such as a thick sheet in A4 size in the first sheet feed cassette $41_1$ and a thin sheet of the same size in the second sheet feed cassette $41_2$.

Under the condition stated above, if a size and a type of transfer sheet P are specified for conducting copying, transfer sheet P is fed out of the sheet feed cassette that corresponds to the specification, thus, transfer sheet P is conveyed to the image forming section 30 under the structure of plural conveyance rollers shown in FIG. 1.

In the present embodiment, there are further provided, as a means for feeding transfer sheet P, bypass feed tray 41H and outer sheet feed means 41L (so-called LCT) which can store a large quantity of transfer sheets P in advance as shown in FIG. 1, in addition to the sheet feed cassette 41 constituted as stated above. According to the former, it is possible to take actions when conducting image forming especially on a specific transfer sheet or an OHP, while the latter makes it possible to conduct continuous image forming for a large quantity of transfer sheets P.

Incidentally, in FIG. 1, there is shown an occasion wherein three sheet feed cassettes, bypass feed tray 41H and outer sheet feed means 41L, totaling five are provided, and in the invention, the number of sheet feed means which can be provided is not limited in principle. Namely, sheet feed means in any number may be provided.

Lastly, finishing section 70 is a station where the finishing work is conducted on the transfer sheet P on which images have been formed after its passage through the transfer sheet conveyance section 40 and image forming section 30 (and also through transfer sheet reversing section 60 in the case of two-sided copying for both the front side and the back side).

To be more concrete, the finishing section 70 conducts various processing such as sorting, stapling and punching for transfer sheet P on which images have been formed.

The sorting, in this case, is processing to arrange, in the desired order, transfer sheets P ejected continuously, or to stack them in accordance with the aforesaid order. In an example of the sorting, when utilizing the automatic two-sided document conveyance section 100 stated above, "plural sets" of transfer sheets P are arranged in the desired order so that the order may be the same as the stacking order for a bundle of documents stacked on its document tray 101.

Incidentally, in this case, finishing section 70 conducts linking operations such as processing to change the order of sheet ejection in succession.

The stapling is an operation to provide an unillustrated binding tool at a prescribed position on each of plural and stacked transfer sheets P on which images have been formed, and to bind the transfer sheets P. Further, the punching is an operation to form "a hole for binding" through which a binding string is threaded later at a prescribed position on plural and stacked transfer sheets P, in place of providing a binding tool in the aforesaid stapling.

Figure 2:
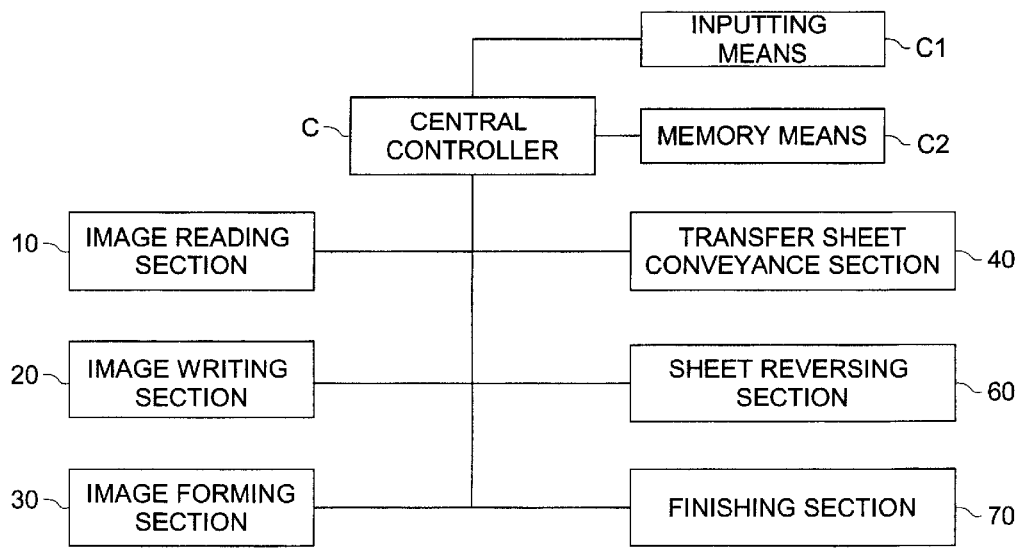
FIG. 2 is a schematic diagram showing an example of electric structure of a copying apparatus relating to the present embodiment.

Next, an example of the electric structure of an apparatus relating to the copying apparatus having the aforesaid mechanical structure will be explained as follows, referring to FIG. 2. Mechanisms of the aforesaid image writing section 20, image forming section 30, transfer sheet conveyance section 40, transfer sheet reversing section 60 and finishing section 70 are arranged to be generalized and controlled by central controller (control means) C as shown in FIG. 2. Further, on the central controller C, there are provided input means C1 and memory means C2.

Figure 3:
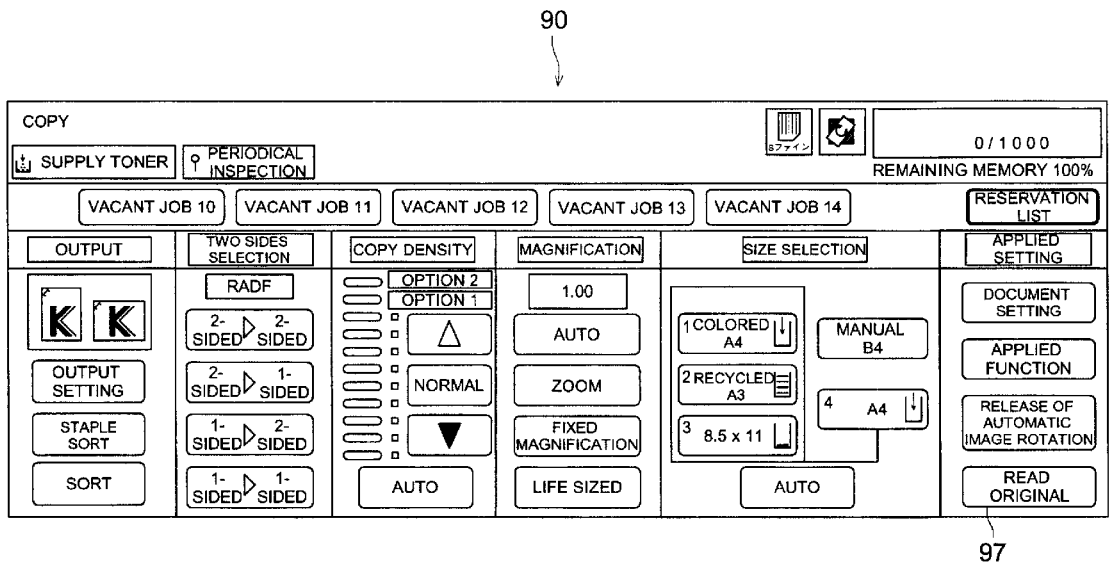
FIG. 3 is a schematic diagram showing an example of concrete structure of an input means relating to the present embodiment.

As a concrete structure of the input means C1, it may be possible to employ one that is equipped with well-known touch panel 90 shown, for example, in FIG. 3. A user of the apparatus can change copy density, magnification and output setting of transfer sheet P by pressing and specifying each type of window indicated on the touch panel 90. Incidentally, in this case, the input means C1 serves also as a display means that transfers the setting situations on the apparatus for an operator.

The memory means C2 is used when storing temporarily the image information concerning the surface of a document read by the image reading section 10. For example, in the "image forming relating to a booklet type", image information about all document groups composed usually of a plurality of documents is stored in the memory means C2, prior to actual output (image forming) for transfer sheet P.

Let is be assumed, in the following, that explanation about a working effect of the copying apparatus having the aforesaid structure example is given in accordance with working procedures shown in FIG. 4, FIG. 13, FIG. 16 and FIG. 19, focusing on roles of the central controller C.

(Specification and Adjustment of Printing Positions for Additional Information)

This relates to that the printing position can be set freely on transfer sheet P when printing additional information relating to the date and hour, the expression or the page, in the course of forming images on transfer sheet P.

Figure 4:
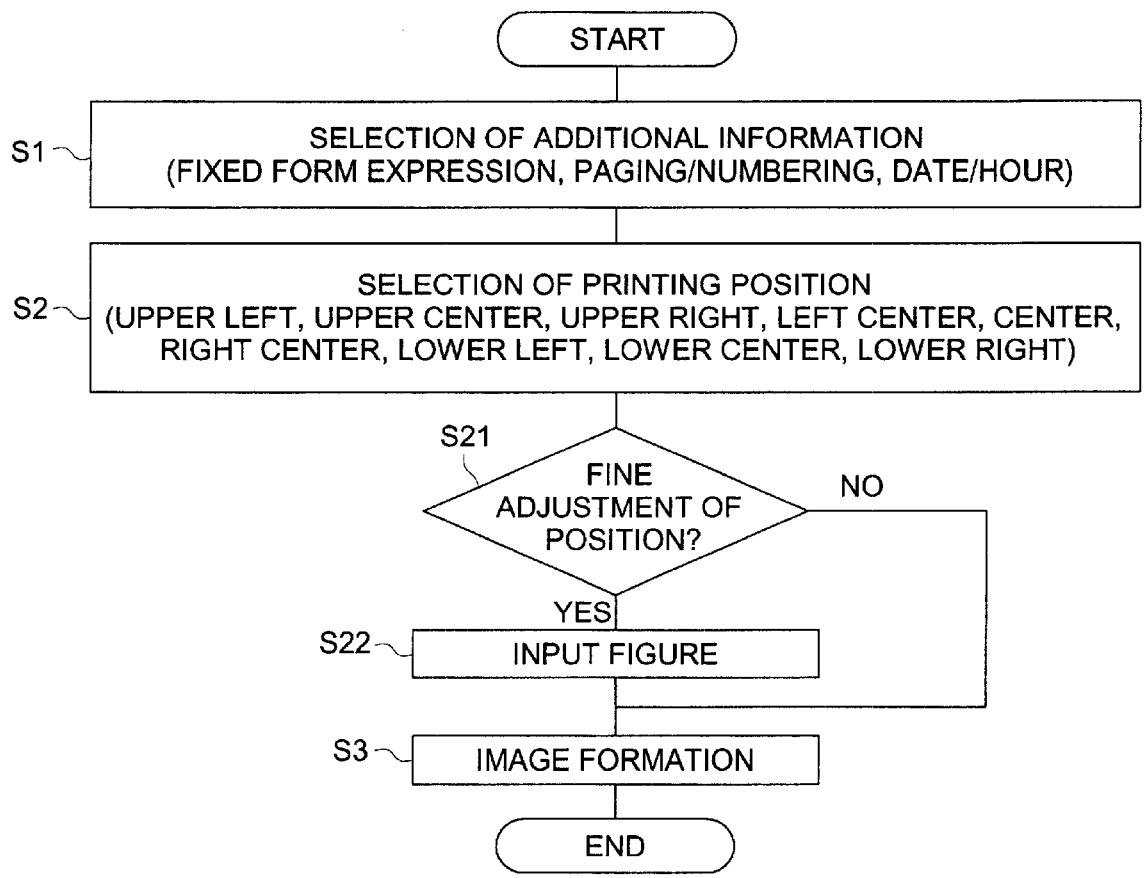
FIG. 4 is a flow chart showing an example of work procedures for conducting specification of the printing position for additional information and adjustment.

First, as shown on step S1 in FIG. 4, additional information to be printed is selected through an input display (input means) shown in FIG. 5, for example. As additional information in the present embodiment, there are given a fixed-form expression, pages (page information), numbering, and the date and hour (information of the date and hour) as shown in FIG. 5. Incidentally, the input display shown in FIG. 5 may be of the structure wherein it appears when "applied functions", for example, in the basic display shown in FIG. 3 are specified.

The "fixed-form expression" in this case means a character string(=expression) which is used frequently and is determined in advance, such as, for example, "urgent", "confidential" and "copy" (and others, see FIG. 6). "Page" or "numbering" means numbers which are given properly to the plural transfer sheets P in succession and in series, when a plurality of transfer sheets P are subjected to image forming, while, "the date and hour" means the actual time in the course of copying.

In FIG. 5, those to be printed are selected from additional information as ones stated above by indicating with fingers for example. When the occasion to select the "fixed-form expression" is considered, the screen shown in FIG. 6, for example, is made to appear, and the expression (for example, "urgent") to be printed is selected.

Next, as shown on step S2, a printing position of the expression to be printed on transfer sheet P is selected. For selection of the printing position, printing position selection area 91 shown in FIG. 6 is used. Namely, in the present embodiment, transfer sheet P is divided into the total nine imaginary areas positioned respectively at "upper left", "upper center", "upper right", "center left", "center", "center right", "lower left", "lower center" and "lower right" areas, and a printing position can be set by selection (for example, "upper center") from the nine imaginary areas.

After completion of the setting work up to the foregoing, the image forming thereafter may be conducted as usual as shown on step S3 in FIG. 4. Owing to this, it is possible to print the additional information selected voluntarily at any position on transfer sheet P.

In a statement that is more concrete in connection with the structure example stated above, it is possible to print additional information on transfer sheet P by forming an electrostatic latent image relating to additional information in prescribed format at a prescribed position, together with an electrostatic latent image relating to an image formed on photoreceptor drum 31, when central control means C controls the aforesaid image writing section 20, especially an unillustrated semiconductor laser directly, based on information whose position is set.

Incidentally, with regard a printing position for additional information from the aforesaid nine areas, it is convenient to determine a "default value" in advance. Namely, if there exists an existing value for the position to be printed, such as "lower center" for a page and "upper right" for the date and hour, for example, immediately after rise of the copying apparatus, it contributes to convenience of a user in working.

In the present embodiment, in addition to the function that position selection from the total nine areas and setting are possible, it is also possible to make fine adjustment about the position, additionally after the position selection (steps S21 and S22 in FIG. 4). This is conducted by pressing adjustment button 96 shown in FIG. 6 to make adjustment screen shown in FIG. 7 appear, for example, and by then using the adjustment screen. Namely, with regard to each position of nine areas shown in FIG. 6, the "reference position" is fixed in advance within each positional range, and by using buttons 93 for directions and numeral adjustment buttons 94 both shown in FIG. 7, fine adjustment from the "reference position" can be made. FIG. 7 shows how to adjust the movement from the reference position by "15.0 mm upward" and how to adjust the movement from the reference position by "10.0 mm leftward". Incidentally, it is preferable that this adjustment be made for about 50 mm in each of the upward, downward, leftward and rightward directions.

With this structure stated above, when the position of image forming and the position of printing additional information are overlapped, it is possible to avoid the overlapping by adjusting the printing position for the additional information.

(Page Printing Relating to Booklet Type)

This relates to an attempt to bring a printing position to a prominent place for page printing which is to be conducted simultaneously when image forming related to a booklet type is conducted.

The "Booklet type" in this case is one wherein transfer sheet P folded double is superposed and folded portion PM is bound, and it is a type to make a "booklet BL" form finally, while, image forming related to that type means image forming for each of plural transfer sheets P constituting the booklet BL. This image forming also means that two images are formed for one side (including distinction between the front side and the back side) of transfer sheet P as shown in FIGS. 9(a)–9(f) or FIGS. 10(a)–10(f).

Page printing for this booklet type is required to be conducted in accordance with rules shown in FIGS. 9(a)–9(f) or FIGS. 10(a)–10(f). Each of FIGS. 9(a)–9(f) shows rules for page printing for left-side-bound 12-page booklet BL type, wherein the first page and the $12^{th}$ page need to be on the front side of the first transfer sheet, and the second page and the $11^{th}$ page need to be on its back side (hereafter, see the drawing). Each of FIGS. 10(a)–10(f) shows rules for a page printing method for right-side-bound booklet BL.

There is further considered an occasion wherein image forming for "landscape booklet" shown in FIGS. 11(a)–11(f) is conducted, which is different from the case of so-called "portrait booklet" shown in FIGS. 9(a)–9(f) or in FIGS. 10(a)–10(f). Even in this case, it is the same as the case of FIGS. 9(a)–9(f) or FIGS. 10(a)–10(f) that two images are formed on one side (including distinction between the front side and the back side) of transfer sheet P, and rules for page printing exist.

Incidentally, let it be assumed that central controller C "imagines" the situation of FIGS. 9(a)–9(f), FIGS. 10(a)–10(f) or FIGS. 11(a)–11(f) when trying to conduct image forming relating to a booklet type. "Imagine" in this case means "preparing in advance" implementation of control such as copying of image information for the first sheet and $12^{th}$ sheet of document on the front side of the first sheet of transfer sheet P with regard to total image information, after storing image information about plural documents on the memory means C2, when conducting concretely, for example, image forming about a booklet type in accordance with FIGS. 9(a)–9(f). Incidentally, it is arranged so that a user of the apparatus can establish for central controller C through the input means C1, that image forming relating to this booklet type (including distinction between "portrait booklet" or "landscape booklet") is carried out.

In the present embodiment, it is possible to establish a printing position and to adjust it in the same operations as those in the establishment of a printing position for additional information stated above, even in the case of page printing concerning the booklet type. Namely, it is possible to arrange so that an image screen shown in FIG. 12, for example, may appear if page button 95 is selected in FIG. 5, and to conduct selection or setting of a printing position for that page(=additional information), by using printing position selection area 91 on the right side in FIG. 12 which is the same as that in FIG. 6. In a word, in this case, page printing that directly follows an area selected as "upper left", for example, or a value for adjusting from the reference point, is conducted along the flow exactly the same as a flow chart shown in FIG. 4. However, the page printing is naturally conducted in conformity with "rules" shown in FIGS. 9(a)–9(f), FIGS. 10(a)–10(f) or FIGS. 11(a)–11(f).

In the present embodiment, it is also possible to conduct page printing under an "outer printing mode" described below. Namely, when the "outer printing mode" is set in advance as shown in FIG. 13, position of additional information (step S1) and position selection (step S2) both in FIG. 4 are conducted in exactly the same way, but, when areas of "upper center", "center" and "lower center" (in the case of "portrait booklet" shown in FIGS. 11(a)–11(f)), or areas of "center left", "center" and "center right" (in the case of "landscape booklet" shown in FIGS. 11(a)–11(f)), both in printing position selection area 91 are selected, as shown in step T1 in FIG. 13, namely, when either area adjoining the page that adjoins booklet BL is selected, there is conducted page printing described below.

For example, when image forming relating to a "portrait booklet" type as shown in FIGS. 10(a)–10(f) is conducted and when "lower left" is selected, central controller C controls a printing position for that page as it is one indicated with symbol V3 shown in FIGS. 14(a)–14(f). In a word, page printing relating to the left half-page of the transfer sheet P (first page) is on the "lower left" and page printing relating to the right half-page (12th page) is on the "lower right", on the front side of the first sheet of transfer sheet P.

In this connection, if the setting of "lower left" is just followed, page printing for "lower left" is conducted consistently, as symbol F shown together in FIGS. 14(a)–14(f). However, in this case, if transfer sheets P on which images have been formed are bound, a portion to be printed in the vicinity of folded portion PM turns out to be extremely hard to see (for example, second page and fourth page, in short, in this case, even pages).

In the present embodiment, therefore, when the page turns out to be hard to see in a booklet BL type when the specified page printing position is just followed as stated above, the printing position is automatically changed and set to the portion near an edge of transfer sheet P that is away from a central portion of transfer sheet P which is to be folded portion PM of the booklet BL (step T2 in FIG. 13). In other words, the printing position is changed so that it is positioned at an "outer side" of transfer sheet P when booklet BL is opened to see.

Incidentally, in the case stated above, even in the case of "center left" and "center right" (see symbol V2 in FIGS. 14(a)–14(f) and "upper left" and "upper right" (see symbol V1 in FIGS. 14(a)–14(f), the control that is exactly the same is conducted, in addition to the case of "lower left" and "lower right". Further, when the selected or established printing position represents "upper center", "center" and "lower center", printing just following the establishment is conducted (the same as the above also for the second transfer sheet and thereafter, step T1 in FIG. 13), as shown with symbol R in the drawing showing the front side of the first transfer sheet in FIGS. 14(a)–14(f).

Further, the control for page printing described above is applied also to the occasion of "landscape booklet" shown in FIGS. 11(a)–11(f) in exactly the same way. In this case, however, when either area excluding "center left", "center" and "center right" is selected in step T1 in FIG. 13, which is different from the occasion of "portrait booklet", a page printing position is changed and established for each of "upper left" and "lower left", "upper center" and "lower center" and "upper right" and "lower right", as shown in step T2 in the same drawing. For example, when "upper center" is selected, there is conducted the control shown in symbol W2 in FIGS. 15(a)–15(f). This applies also to the other cases (see symbols W1 and W3 in FIGS. 15(a)–15(f)). Further, when "center left", "center" and "center right" are selected, there is conducted page printing which just follows the setting, in the same way as in the case of "portrait booklet" (step T1 in FIG. 13).

Owing to the foregoing, it is possible to confirm printed pages easily even after binding transfer sheets P on which images have been formed in the form of a booklet BL.

Further, in the case of setting the "outer printing mode" stated above, it is possible to set "outer printing mode other than center" in place of the "outer printing mode". Namely, in this case, a flow chart is one like that shown in FIG. 16 wherein judgment in step T1 in FIG. 13 is substituted with "center?".

Under the "outer printing mode other than center", there are provided characteristics which are different from those in FIG. 13, with regard to the occasion when "upper center" or "lower center" is selected in the case of "portrait booklet", or when "center left" or "center right" is selected in the case of "landscape booklet".

First, when "upper center" is selected, for example, in the case of "portrait booklet", if page printing is executed by just following the setting, the printing positions are represented by R1 and R2 shown in FIG. 17, but, in the case of the "outer printing mode other than center", the page printing position shown with symbol R1 is changed to "upper left" and the page printing position shown with symbol R2 is changed to "upper right", respectively.

Figure 14:
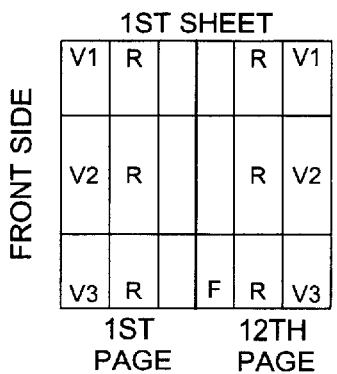
Figure 14:
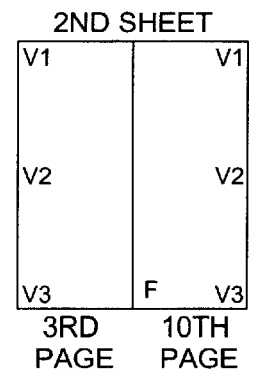
Figure 14:
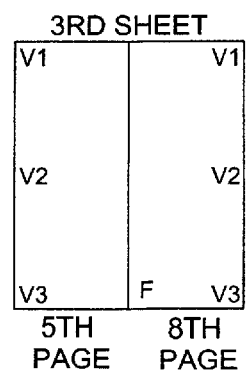
Figure 14:
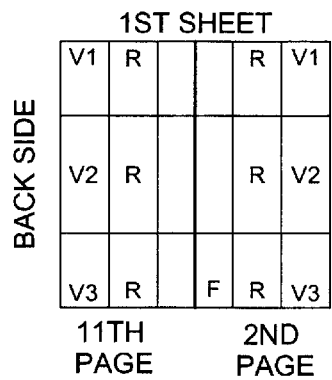
Figure 14:
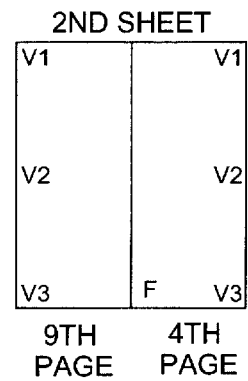
Figure 14:
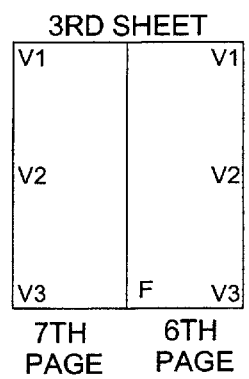

Namely, in this case, even the printing position of "upper center" printed to follow the setting in FIG. 13 or FIGS. 14(*a*)–14(*f*) is automatically changed and set to the vicinity of an edge of the transfer sheet P that is away from the central portion of the transfer sheet P that is to be folded portion PM of the booklet BL (step T2 in FIG. 16). Then, that change is made so that the printing position may correspond to "out side" of transfer sheet P when booklet BL is opened to be observed. Incidentally, even when "lower center" is selected (symbols R3 and R4 in FIG. 17), a page printing position is changed in the same way as in the foregoing (symbol V3 in FIG. 17).

Further, when "center left" is selected, for example, in the case of "landscape booklet", printing positions which are to be shown originally by symbol M1 and symbol M2 in FIG. 18 are changed respectively to "upper left" or "lower left" (symbol W1 in FIG. 18). Even when "center right" is selected, the change of printing position is the same (from symbols M3 and M4 in FIG. 18 to the printing position shown with symbol W3).

Figure 15:
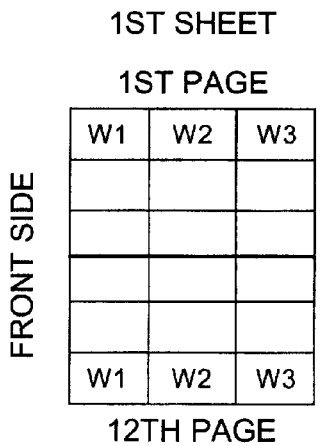
Figure 15:
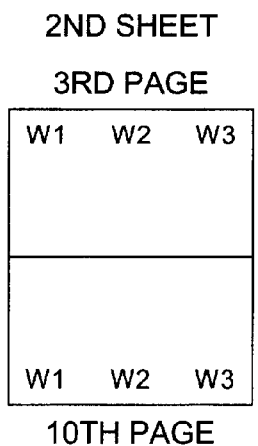
Figure 15:
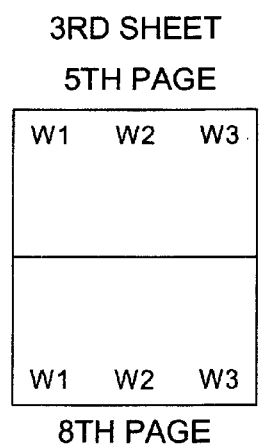
Figure 15:
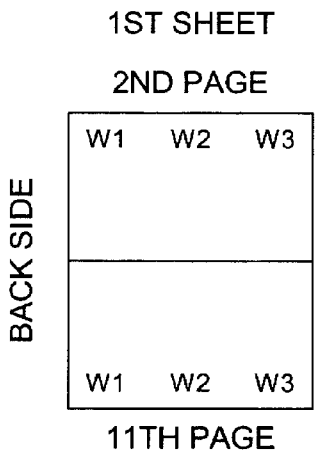
Figure 15:
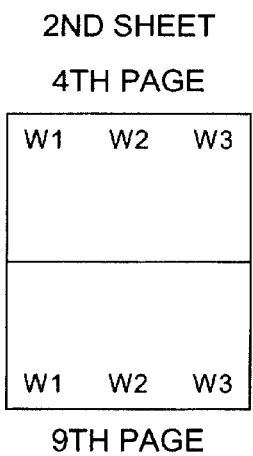
Figure 15:
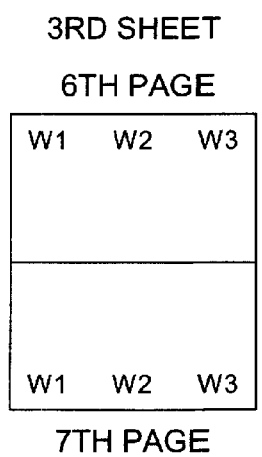

Incidentally, when "center" is selected, or when an area other than those described above is selected, the change of printing position is exactly the same as those in FIG. 13, FIGS. 14(*a*)–14(*f*) or FIGS. 15(*a*)–15(*f*).

Even in this case, it is apparent that an effect which is just the same as that described above can be enjoyed. Namely, it is possible to confirm printed pages easily even after binding transfer sheets P on which images have been formed in the form of a booklet BL.

Incidentally, though there is shown only the flow relating to "page printing" in FIG. 13–FIG. 16, for convenience of explanation, "image forming" is naturally conducted simultaneously. In this connection, a flow for only "page printing" is shown in FIG. 19 which will be explained later, it is absolutely the same as those in FIG. 13 and FIG. 16 that image forming is conducted simultaneously.

(Page Printing Relating Chaptering)

This relates to conducting page printing which is easy to see and corresponds to chaptering, when chaptering has already been made for a document group composed of a plurality of sheets of document, for example, or when conducting chaptering newly for the plural transfer sheets in the course of image forming on plural transfer sheets concerning a certain document group.

In this case, it is an assumption that "chaptering setting" concerning the aforesaid "document group" (or, corresponding to contents of document surface of each document) is conducted for plural transfer sheets P, as shown in step U1 in FIG. 19. This "chaptering setting" can be carried out as follows, for example.

Under the assumption that a document group is composed of documents in quantity of n sheets, there is prepared "chaptering setting mode" wherein the specification for $n_1$, $n_2$, $n_3$, ... on the half way of reading satisfying $(1 \leq) n_1 < n_2 < n_3 < \ldots (\leq n)$ is possible. Then, there is conducted processing to change "chapter number", when automatic two-sided document conveyance section 100 actually reads the document group and when each of $n_1$, $n_2$ and $n_3$ is specified.

Namely, in the example stated above, there is arranged an establishment for documents in quantity of n sheets which will be read thereafter in the aforesaid mode that a small set of a bundle of documents in quantity ranging from $n_{q-1}$ or more to under $n_q$ is divided and each division representing one unit is given a chapter number, exemplifying that a group from $n_1^{th}$ to under $n_2^{th}$ is given the chapter number of "1"(=First Chapter) and a group from $n_2^{th}$ to under $n_3^{th}$ is given the chapter number of "2"(=Second Chapter). Incidentally, when $n_1$ is not equal to 1, a small set of a bundle of documents in quantity ranging from 1 to $n_1$ can be recognized as "a cover" or "an introduction".

Incidentally, even in the case that image information is temporarily stored in the memory means C2 not for document groups "which will be read" but for document groups "which have been read (namely, have been read collectively)", the procedures mentioned above can naturally be applied, if the numbers of sheets of $n_1$, $n_2$, $n_3$, ... are specified for the document groups which have been read.

Further, the procedures stated above make it possible to conduct "chaptering setting" in exactly the same method, even in the case that the document groups have already been chaptered, or in the case that plural transfer sheets P to be copied will be chaptered newly (when document groups have not been chaptered in particular).

Now, when printing pages after conducting this "chaptering setting", the present embodiment makes it possible to obtain the following effect.

First, with regard to "printing pages", the basic operation is to select, from the selection screen shown in FIG. 5, a "page" as additional information to be printed so that the screen shown in FIG. 12, for example, may appear (see steps S1 and S2 in FIG. 19), because there is no difference from the additional information mentioned above. For conducting functions relating to the "chaptering setting", chaptering page button 96 further needs to be selected from FIG. 12.

After that, when ordinary image forming is conducted, page printing for transfer sheet P is carried out in a form corresponding to the chaptering, or in a form following the chaptering. Namely, to be concrete, when the first chapter is composed of 6 pages, page printing is conducted in a way of "1-1, 1-2, ..., 1-6", for example, and when the second chapter is composed of 8 pages, page printing is conducted in a way of "2-1, 2-2, ..., 2-8".

It is a matter of course that these actions are realized interlocking with the aforesaid specification of the number of sheets of $n_1$, $n_2$, $n_3$, ... The aforesaid "interlocking" is explained point by point, as follows, referring to FIG. 19, by assuming that $n_1$ equals 1 ($n_2$ and $n_3$ are arbitrary) for convenience' sake of explanation.

First printing for the first sheet($=n_1^{th}$ sheet) up to $(n_2-1)^{th}$ sheet is started from "1-1" and is conducted up to "1 (chapter)-($n_2$-1) (page)". This corresponds to repetition of steps U4 and U5 (including steps U2 and U3, initial value of p is "0"), according to FIG. 19.

When the reading up to $n_2^{th}$ sheet is completed ("p=$n_x$" in step U4 in FIG. 19), transfer is made from image reading section 10 (automatic two-sided document conveyance section 100 in particular) to central controller C to that effect, and the central controller C receives this transfer and controls image writing section 20 (semiconductor laser in particular) so that printing may begin with "2-1" from the following transfer. Namely, repetition of steps U4 and U5 in FIG. 19 is conducted again. However, a value of x in the drawing turns out to be 3 in step U6.

After that, the foregoing is repeated until the reading is completed (see steps. U2 and U3 in FIG. 19). Incidentally, the example of processing shown in FIG. 19 is just an exemplification to which the invention is not limited.

Incidentally, for realizing the "interlocking" mentioned above for document groups stored temporarily in memory means C2, there is required an arrangement wherein information or a property concerning the number of sheets such as the ordinal number of the document in the total document groups is given to each stored content of the document of each one sheet (including discrimination between the front side and the back side) in the memory means C2, then, a checking means capable of confirming the property is provided so that central controller C may receive the information transferred from the checking means and judge whether or not the transferred information agrees with the specification of $n_1, n_2, n_3, \ldots$ Page printing of this form corresponding to this chaptering makes it possible to print a page which is easier to see.

(Page Printing Relating to JOB)

This relates to conducting page printing which is easy to see and corresponds to each JOB, for document groups in which each of plural document bundles can be divided as "JOB".

The "JOB" in this case is a unit for conducting image forming defined as "one unit" by image information relating to a certain bundle of documents and by action-environmental condition (establishment information) which is necessary for driving a copying apparatus (present apparatus) when conducting image forming for the bundle of documents (see FIG. 3).

The image information relating to a image information relating to a bundle of documents is represented by contents (characters, patterns etc.) described on the surface of each document constituting the bundle of documents. The action-environmental condition is, in other words, a control condition relating to a copying apparatus in the course of outputting the image information. To be concrete, it includes information such as distinction concerning sizes of A4/B5 relating to a document or transfer sheet P, distinction concerning sheet types (kinds) such as thick sheet/thin sheet relating to the same, and distinction relating to transfer sheet processing after image forming such as stapling/non-stapling. In the actual output relating to the JOB, correspondence is made by selective control of the sheet feed cassette 41 on which transfer sheets P with the corresponding sheet type are stacked for distinction of sheet type for transfer sheet P, for example, and by making the control mode for the finishing section 70 to be different for stapling/non-stapling. When assuming the occasion to divide document groups into three document bundles in detail, for example, there is considered an occasion for setting differently as "action-environmental condition", such as image forming for "color sheet in A4 size" for the first JOB, image forming for "thick sheet in A4 size" for the second JOB, and "ordinary sheet in A4 size and two-sided copying" for the third JOB.

When conducting image forming employing this "JOB" and conducting page printing, the document groups stated above, for example, are relevant to each other, and as is apparent when assuming the case to "divide" as stated above, if page printing is conducted by regarding "JOB" as "a chapter", arrangement of transfer sheets P after image forming is easy, resulting in page printing that is easy to see.

Namely, if page printing is conducted for each page in a way of "1-1, 1-2, ..., 1-6" when the first JOB is composed of 6 pages, and in a way of "2-1, 2-2, ..., 2-8" when the second JOB is composed of 8 pages, it is convenient because the ordinal number of JOB for the image forming is quite obvious.

For realizing the page printing like this, the control that is mostly the same as the aforesaid "page printing relating chaptering" has only to be conducted.

In this case, however, "JOB setting" is conducted in place of "chaptering setting" in step U1 in FIG. 19. With regard to the "JOB setting" in this case, if reading for plural document bundles is finished respectively by specifying document reading button 97 shown at rightmost and lowermost portion in FIG. 3, for example, and if "defining" employing input means C1 is conducted for each of them, setting jobs are completed while each JOB is being given a property of its own JOB number, such as the first JOB, second JOB, ... in succession.

If the JOB number stated above is made to be $P_{job}$ in place of judgment of "$p=n_x$?" in step U4 in FIG. 19, the process relating to "numeral confirmation of $P_{job}$" is substituted, and "page printing, namely $P_{job-1, 2, \ldots, m}$" appears in place of "page printing, namely $(x-1)-1, \ldots, (n_x-1)$" in step U5 in FIG. 19. It is a matter of course that the symbol "m" in this case is the number of sheets of document captured in a certain JOB number $P_{job}$. Incidentally, in this "page printing relating to JOB", steps U2 and U3 in FIG. 19 are not needed.

(Page Printing Accompanied with Display for All Pages)

This relates to conducting simultaneously the display of all documents (all pages) constituting document groups and the printing of each page, and thereby to carry out page printing which is easy to see.

In the present embodiment, implementation of this function is characterized to have the restriction that reading of document groups needs to be conducted "collectively". Namely, when the document group is composed of 35 sheets, it is preferable to arrange so that page printing accompanied with display for all pages can be conducted only when reading for 35 sheets is carried out collectively. Under this arrangement, it is possible to conduct page printing based on sure information, without having troubles that any errors are caused, when the aforesaid function is executed under the condition that the total number of documents is not known.

With regard to "reading collectively", in this case, it is preferable to prepare such "mode" (hereinafter referred to as "collective reading mode") in advance so that the function may be realized. To be more concrete, since it is usually convenient to conduct outputting after reading documents necessary to constitute booklet BL, in the aforesaid "image forming relating to a booklet type", such occasion can be made the subject for reading under the "collective reading mode". Further, even for the occasion including the process to copy contents of plural documents on a sheet of transfer sheet P, the "collective reading mode" may be regarded as appropriate.

With regard to document groups which have been read through the "collective reading mode", page printing that is conducted simultaneously with image forming for the read document groups is as follows. First, "page" is selected from the selection screen in FIG. 5 as additional information to be printed as a basic operation, because there is no difference from the aforesaid each function as far as the execution of "page printing" is concerned, so that the screen shown in FIG. 12 may appear. Then, for executing the function relating to "page printing accompanied with display for all pages", page button accompanied with display for all pages 98 is further selected from FIG. 12.

After that, page printing on transfer sheet P is conducted in the form accompanied with display for all pages, when ordinary image forming is conducted. Namely, when the total number of documents is represented by n sheets, page printing for "1/n, 2/n, . . . , n/n" is conducted in succession from the first page.

The foregoing make it possible to conduct page printing that is easy to see, based on decisive information of all pages.

As stated above, an image copying apparatus of the invention makes it possible to conduct, at any position on a recording material, the printing of additional information composed of fixed-form expression, page information, the date and hour information which is conducted simultaneously with image forming on the recording material, and it makes it possible to conduct its adjustment. Further, as stated above, the invention makes it possible to carry out page printing relating to a booklet type, page printing relating to chaptering and page printing relating to JOB, in a form appropriate to each of them.

In summary, the invention makes it possible to conduct printing of additional information including page printing in a form which is easy to see and which satisfies the demands of users.

What is claimed is:

1. An image forming apparatus comprising:
   (a) an image reading means for reading an image on a document;
   (b) an image recording means for recording the image read by the image reading means onto a recording material;
   (c) an input means for enabling selection of an area from among a plurality of preset imaginary areas and for enabling a positional adjustment in the selected area for setting, on an arbitrary position on the recording material, a recording position for additional information to be recorded on the recording material by the image recording means in addition to the image on the document; and
   (d) a controller for controlling the image recording means to record the additional information onto the recording position set by the input means.

2. The image forming apparatus of claim 1, wherein the input means enables the positional adjustment to be conducted with respect to a prescribed reference point in the selected area.

3. The image forming apparatus of claim 2, wherein the input means enables the positional adjustment to be conducted by inputting numerical values with respect to each of upper, lower, left and right directions.

4. The image forming apparatus of claim 3, wherein the numerical values are set to be inputted within a range of −50 mm to +50 mm.

5. The image forming apparatus of claim 1, wherein the additional information comprises at least one of a predetermined expression, page information, date information, and time information.

6. The image forming apparatus of claim 1, wherein the plurality of imaginary areas comprise a predetermined number of areas which are divided with respect to the recording material.

7. The image forming apparatus of claim 6, wherein the plurality of imaginary areas comprise nine areas including an upper left area, an upper center area, an upper right area, a left center area, a center area, a right center area, a lower left area, a lower center area and a lower right area which have been divided with respect to the recording material.

8. The image forming-apparatus of claim 1, wherein the image reading means reads collectively each image of a document group comprising a plurality of documents, and the controller controls the recording means so that the recording means records all the documents of the document group.

9. An image forming apparatus comprising:
   (a) an image reading means for reading an image on a document;
   (b) an image recording means for recording the image read by the image reading means onto a recording material;
   (c) an input means for enabling: (i) setting, on an arbitrary position on the recording material, of a recording position for additional information to be recorded on the recording material by the image recording means in addition to the image of the document, (ii) selection of an area from among a plurality of preset imaginary areas, and (iii) a positional adjustment in the selected area; and
   (d) a controller for recording the additional information at the recording position set by the input means, and controlling the image recording means to carry out an image recording suitable for folding and superposing a plurality of recording materials on which images have been recorded to produce a booklet type product.

10. The image forming apparatus of claim 9, wherein the input means enables the area from among the plurality of preset imaginary areas to be selected with respect to one surface of the recording material which has been folded.

11. The image forming apparatus of claim 10, wherein the input means enables the recording position to be adjusted within any selected area.

12. The image forming apparatus of claim 10, wherein the plurality of imaginary areas comprise nine areas including an upper left area, an upper center area, an upper right area, a left center area, a center area, a right center area, a lower left area, a lower center area and a lower right area with respect to one surface of the recording material which has been folded.

13. The image forming apparatus of claim 12, wherein when the area selected by the input means is an area adjacent to an adjoining page on the recording material in a form of the booklet type product, the controller controls the image recording means to make the recording position of the additional information to move from the area adjacent to the adjoining page to a direction of an edge of the recording material away from the adjoining page, and then to record.

14. The image forming apparatus of claim 13, wherein when the recording material is folded in a longitudinal direction and superposed and the area adjacent to the adjoining page on the recording material is selected by the input means, the controller changes the recording position of the additional information from the selected area to one of an upper left area, a center left area and a lower left area on a left page, and to one of an upper right area, a center right area and a lower right area on a right page, and then the recording means records the additional information to the changed area.

15. The image forming apparatus of claim 13, wherein when the recording material is folded in a lateral direction and superposed and the area adjacent to the adjoining page on the recording material is selected by the input means, the controller changes the recording position of the additional information from the selected area to one of an upper left area, an upper center area and an upper right area on an upper page, and to one of a lower left area a lower center area and a lower right area on a lower page, and then the recording means records the additional information to the changed area.

16. The image forming apparatus of claim 13, wherein when the area selected by the input means is an area other than a center area, the controller changes the recording position for the additional information from the area adjacent to the adjoining page to a direction of an edge of the recording material away from the adjoining page, and then the recording means records the additional information to the changed area.

17. The image forming apparatus of claim 9, wherein the additional information comprises information relating to the plurality of recording materials.

18. An image forming apparatus comprising:
(a) an image reading means for reading an image on a document;
(b) an image recording means for recording the image read by the image reading means and page information onto a recording material;
(c) a dividing and setting means for enabling a setting of dividing symbols by which each of a plurality of document bundles in a small set constituting document groups can be divided; and
(d) a controller for controlling the image recording means so that the image, the page information and the dividing symbols are recorded onto the recording material.

19. The image forming apparatus of claim 18, wherein each of the dividing symbols is a chapter number that is set to one unit representing a respective one of the document bundles.

20. The image forming apparatus of claim 19, wherein the dividing and setting means includes means for designating an ordinal number of a document on which the chapter number is scheduled to be renewed.

21. The image forming apparatus of claim 18, wherein each of the dividing symbols is a JOB number that is set to one unit representing a respective one of the document bundles.

22. The image forming apparatus of claim 18, further comprising an input means for enabling selection of an area from among a plurality of preset imaginary areas and for enabling a positional adjustment in the selected area for setting, on an arbitrary position on the recording material, a recording position for additional information to be recorded on the recording material by the image recording means in addition to the image on the document.

* * * * *